United States Patent [19]

Marscholl et al.

[11] Patent Number: 4,984,386
[45] Date of Patent: Jan. 15, 1991

[54] TENSIONING DEVICE FOR CABLE WINDOW LIFTER

[75] Inventors: Klaus Marscholl, Ehringshausen; Thomas Medebach, Wetzlar, both of Fed. Rep. of Germany

[73] Assignee: Kuester & Co., Ehringshausen, Fed. Rep. of Germany

[21] Appl. No.: 514,305

[22] Filed: Apr. 25, 1990

Related U.S. Application Data

[62] Division of Ser. No. 400,546, Aug. 31, 1989, Pat. No. 4,941,286.

[30] Foreign Application Priority Data

Sep. 1, 1988 [DE] Fed. Rep. of Germany ....... 3829680

[51] Int. Cl.$^5$ ............................................. E05F 11/48
[52] U.S. Cl. ..................................... 49/352; 474/101
[58] Field of Search ................ 49/352; 474/101, 109, 474/111

[56] References Cited

U.S. PATENT DOCUMENTS

| | | | |
|---|---|---|---|
| 4,235,046 | 11/1980 | Hess et al. | 49/352 |
| 4,657,523 | 4/1987 | Chevance et al. | 49/352 X |
| 4,753,124 | 6/1988 | Chevance | 49/352 X |
| 4,863,417 | 9/1989 | Kimata et al. | 474/101 |
| 4,941,286 | 7/1990 | Marscholl et al. | 49/352 |

FOREIGN PATENT DOCUMENTS 3737733  5/1988  Fed. Rep. of Germany ........ 49/352

Primary Examiner—Philip C. Kannan
Attorney, Agent, or Firm—Longacre & White

[57] ABSTRACT

The invention concerns a tensioning device for the cable of a cable window lifter which is mounted in a drive bracket pulled up and down along a guide rail by means of a cable wound around an actuation drum. One cable end is solidly joined to the drive bracket whereas the other cable end is connected by a directional lock to the drive bracket. This directional lock compensates any cable elongation taking place within the cable actuation system by means of spring action. The tensioning device of the invention is characterized by providing further compensating means. This further compensation is needed in the event of excessive stresses exerted on the cable actuation system in the closed window position which results in a spurious cable elongation caused thereby. It also eliminates this compensation when this excess stress is no longer present. These further compensation means may consist of a spring additionally inserted between the free cable end and the directional lock; however they may also consist of a tippable and displaceable molded part inside the directional lock. The spring compensates the spurious cable elongation by relaxing before the actual compensation spring becomes effective. In the embodiments with the additionally inserted molded part, the compensation of the spurious elongation takes place by tipping the molded part which slips further by one step (cog) in the directional lock and only upon a real cable elongation.

1 Claim, 2 Drawing Sheets

TENSIONING DEVICE FOR CABLE WINDOW LIFTER

This is a division of application Ser. No. 07/400,546, filed Aug. 31, 1989 now U.S. Pat. No. 4,941,286.

BACKGROUND OF THE INVENTION

The invention concerns a tensioning device for the cable of a window lifter of a vehicle.

It is known to the state of the art to fasten the two cable ends of the window lifter to the drive bracket and thereby to pull this drive means up and down a guide rail. However it is inevitable during the operation of the window lifter that the cable shall gradually stretch and thereby that play will arise in this cable connection, this play making itself felt when the window lift is actuated, for instance by a crank as a dead zone. It is further known to mount a cable-tensioning device at the drive bracket so that the cable stretching is compensated by a spring. Such a tensioning device is disclosed in West German Patent 37 37 733 and U.S. Pat. No. 4,235,046 the disclosures of which are incorporated herein by reference.

However cable stretching appears in cable window lifters not only as an aging effect but it also may arise when the window moves into its upper end position, wherein the drive bracket comes to rest against a stop, excessive force is applied to the crank to artificially elongate the "upper" cable segment between the cable drum and the drive bracket or the guide rail becomes so warped that cable slack arises between the cable drum and the drive bracket. Such cable slack disappears once the window is moved down. Therefore the tensioning device may not become operative when such a spurious, mostly slight cable elongation takes place.

However the known tensioning devices also compensate for such artificial cable elongations. As a result, the cable system for all its ensuing service life is harder to operate, at least until a real cable elongation eliminates this tension.

SUMMARY OF THE INVENTION

Having in mind the limitations of the prior art it is an object of the present invention to create a tensioning device whereby the cable slack generated by excessive force applied to the crank is compensated for separately so that during the next down motion of the window pane, this cable slack is again normally absorbed by the system while the tensioning device proper only becomes operative after actual cable stretching has taken place.

This object is achieved in a first embodiment by inserting an additional spring into the tensioning device, where this additional spring is stronger than the actual compensating spring and for the same force covers a longer path. This means that the spring characteristics of the two springs are appropriately matched to each other.

In a second embodiment a tipping molded part is inserted between the drive bracket and one cable end and is provided with a cog by means of which it merely points in one direction or another in a cogged rack of the drive bracket when there is slight cable slack caused by excessive applied force, whereas in the event of actual cable elongation, it jumps into the next cog gap of the cogged rack.

A third embodiment includes a solution in the form of a displaceable and tippable part guided in the drive bracket on a long pin designed as a cogged rack. In this embodiment the tippable part is a small plate suspended by an aperture from the pin.

BRIEF DESCRIPTION OF THE DRAWINGS

The present invention is illustrated in the drawings in the form of three embodiments, wherein.

DESCRIPTION OF THE PREFERRED EMBODIMENTS

Figure 1:
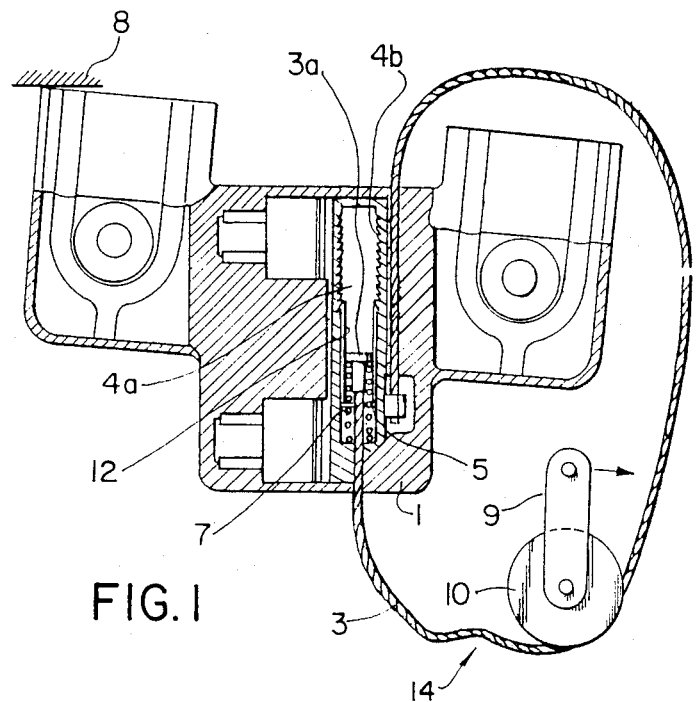
FIG. 1 is an elevation of the tensioning device of the first embodiment shown in the rest position.

FIG. 1 shows the drive bracket 1 in which a U-shaped sheetmetal bail 2 is supported in a displaceable manner, with its U-leg ends bent to the outside in the form of hooks 12. Parts 1 and 2 act as a directional lock 4 which on one hands consists of a cogged rack 4a having sawtooth notches 4 at the drive bracket 1 and on the other hand of the already mentioned hooks at part 2. The hooks elastically engage the notches and together form the directional lock.

A cable 3 acts on the drive bracket 1 and is fastened to it by one end, the other end being connected to the sheetmetal bail 2.

A compression spring 5 is inserted between the drive bracket 1 and the sheetmetal bail 2. As easily noted from inspection, this spring forces the sheetmetal bail 2 ever more upward when cable elongation takes place, the cogs 4b in the cogged rack 4a ever being depressed by another tooth. As a result a dead zone in the window lift system is avoided, every cable elongation being compensated by the stepping of the sheetmetal bail 2.

The components shown and described so far are a tensioning device of the state of the art. In the present invention on the other hand, a further spring 7 is inserted between the cable end fitting 3a and the sheetmetal bail 2. The cable fitting 3a can be raised by this spring 7 in the hook-shaped sheetmetal bail 2. Ordinarily the spring 7 is compressed so that all its turns touch against each other i.e., it is compressed into a solid block (FIG. 1). If now the drive bracket 1 is moved into its upper end position (FIG. 1) and there rests for instance against a stop 8, then the user, by excessively driving the schematically shown crank 9 and the cable drum 10 tensions the cable in its upper half while the lower cable loop part slackens, for instance by warping the (omitted) guide rail. This is indicated in FIG. 1 by the waviness 14 of the cable loop part, the remaining guide elements for the cable such as guide tubes, rollers and the like having been omitted from the drawing for the sake of simplicity.

If the spring 7 were absent, the spring 5 would be operative at once, and the hook-shaped sheetmetal bail 2 would be forced up by another cog. As a result, the entire actuation system would be tensioned more, and such increased tension would not drop after the cable drum is rotated in the opposite direction—once the window is lowered again. Rather the entire window system is harder to operate.

Figure 2:
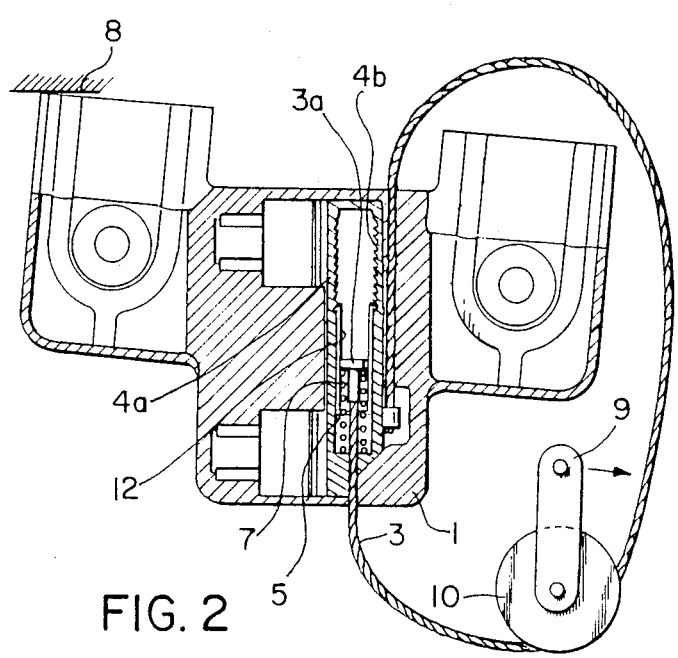
FIG. 2 is an elevation of the tensioning device of the first embodiment shown in the operational position.

That drawback is circumvented in the embodiment shown in FIG. 1 and FIG. 2 by the spring 7 first relaxing and thereby the almost spurious cable elongation being removed from the cable 3. Therefore the cable remains taut also in its lower loop half as shown in FIG. 2.

When the drive means 1 together with the (omitted) window pane is lowered again, then the spring 7 first is forced, by means of the cable end fitting 3a, to again form a solid block and only thereafter is the entire drive bracket 1 moved downward.

The operation above is always assured provided that the spring 7 is so dimensioned that it shall only differ in length by a few millimeters, for instance 2–3 mm, between its fully compressed, block-like condition and its fully relaxed state, that is precisely over the distance by which from experience a user may tension the upper cable loop or elongate the lower one. Moreover the spring 7 is stronger than the spring 5.

The spring 5 becomes operative only after the spring 7 has been fully relaxed and nevertheless cable elongation is present in the lower cable loop, and then the hook-shaped sheetmetal bail 2 in the directional lock 4 is moved by another cog by said spring 5. Thereupon the same initial conditions apply once more.

Figure 3:
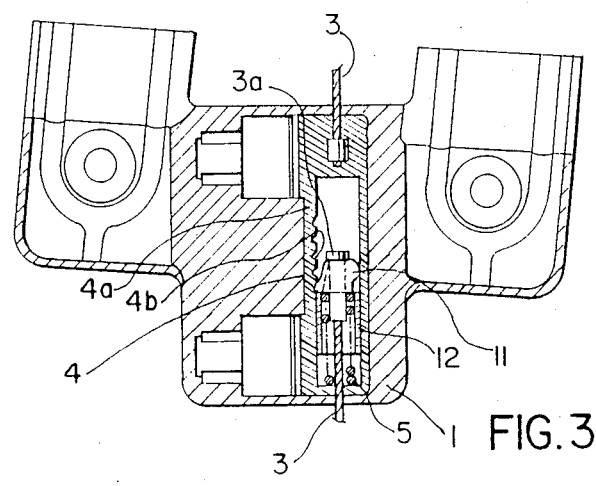
FIG. 3 is an elevation of the tensioning device of the second embodiment shown in the rest position.
Figure 4:
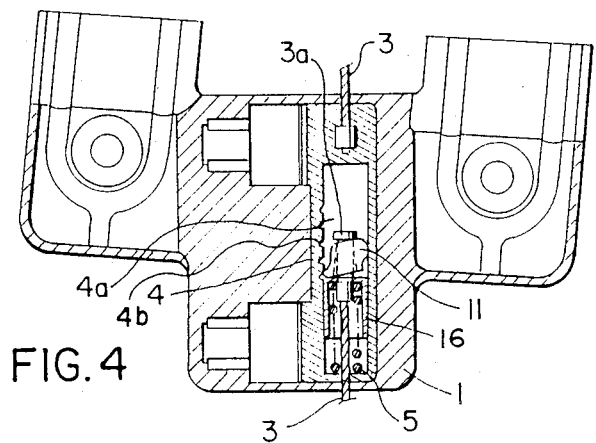
FIG. 4 is an elevation of the tensioning device of the second embodiment shown in the operational position.

The same compensation capability is offered by the second embodiment shown in FIGS. 3 and 4; however this embodiment does not require the additional spring 7.

This goal is achieved in that the cable fitting 3a terminates in a molded part 11 capable, on account of its shape, of assuming an oblique position in the guide duct of the drive means 1.

This second embodiment again includes the drive bracket 1 comprising the cogged rack 4a. The cable 3 passes through a casing 16 receiving the spring 5 which on the other hand rests on the drive bracket 1. However the cable 3 also passes through the molded part 11 and thereupon terminates into its end fitting 3a. The directional lock 4 is operative between a cog 4b of the molded part 11 and the cogged rack 4a.

If now the lower part of the cable 3 should elongate, then it is first compensated by the relaxation of the spring 5. Thereby the molded part 11 shall be forced into an oblique position (FIG. 4), without the directional lock responding. It is only after the cable elongation exceeds a given value that the spring 5 shall press the cog of the molded part 11 out of the cogged rack 4a into the next higher gap between these cogs 4b.

Accordingly this second embodiment operates in the same manner as that of FIGS. 1 and 2. A slight elongation of cable 3—for instance on account of excessive force applied to the crank 9—is removed from the cable loop without the directional lock becoming operative. When the drive means moves in the opposite direction, that compensation is eliminated again. The directional lock 4 compensates only a more substantial elongation of the cable, and this compensation is not eliminated when the drive means descends but instead remains as a constant compensation in the overall system.

Figure 5:
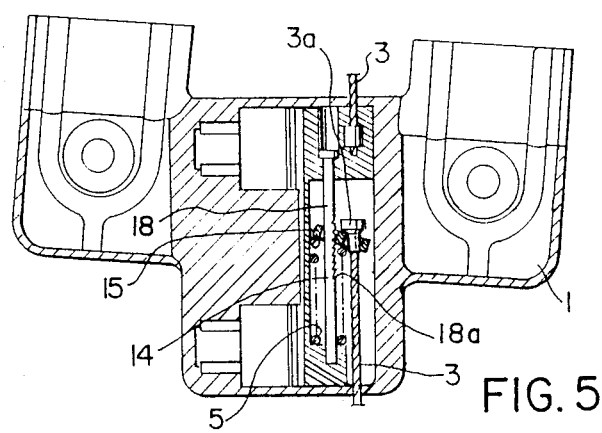
FIG. 5 is an elevation of the tensioning device of the third embodiment.

A third embodiment operating in the same manner but differing in design is shown in FIG. 5. In this embodiment, a special pin 18 is inserted in the drive bracket 1 and comprises a cogging 18a. The pin 18 is seated in a cross-shaded insert 1a which in turn is inserted in a groove or the like present in the drive bracket 1.

The pin 18 is enclosed by a small plate 15 displaceable by means of an aperture relative to the pin 18. The cable 3 passes through another aperture in the small plate 15 and terminates in an end fitting 3a. The spring 5 touches the pin 18 and rests on one hand on the drive bracket 1, i.e., the inset 1a, and on the other hand on the small plate 15 which it forces into the oblique position shown in FIG. 5. In that position, one of the edges of the aperture of the small plate is behind a cog of the pin 18.

The operation of the embodiment corresponds to that of FIGS. 3 and 4. When a slight slack arises in the lower cable loop, then it is compensated by the spring 5 slightly lifting the small plate 15, that is, the small plate of the FIG. 5 is forced into an approximately horizontal position. This slight compensation is removed again from the actuation system once the drive bracket of FIG. 5 is pulled down. Thereupon the small plate again assumes its oblique position.

Only after the cable elongation becomes so large that the small plate 15 can slip ahead by one cog is permanent compensation of this elongation introduced automatically.

I claim:
1. A cable actuated window lifter, comprising:
an actuating drum mounted in the body of a vehicle,
a window drive bracket mounted for vertical adjustment in said vehicle body,
a cable actuated by said drum with a first end solidly joined to said drive and having a second end
a tensioning device defined by a directional lock mounted on said drive bracket and connected to said second end, and
said directional lock comprising:
a cogged rack,
a part displaceable relative to said rack having cog means for engaging said rack and articulated on said second end,
a compression spring surrounding said cable and located between said bracket and said displaceable part for compensation of cable elongation, said first compression spring always stressing said displaceable part with said second cable end articulating on it in the direction of cable tautening relative to said drive bracket, and
said displaceable part is a molded part unilaterally engaging said cogged rack and tipping relative to said cogged rack during cable elongation under stress from said compression spring first in the direction of cable tautening and only upon further cable elongation slipping out of said cogged rack and into a further cog.

* * * * *